UNITED STATES PATENT OFFICE.

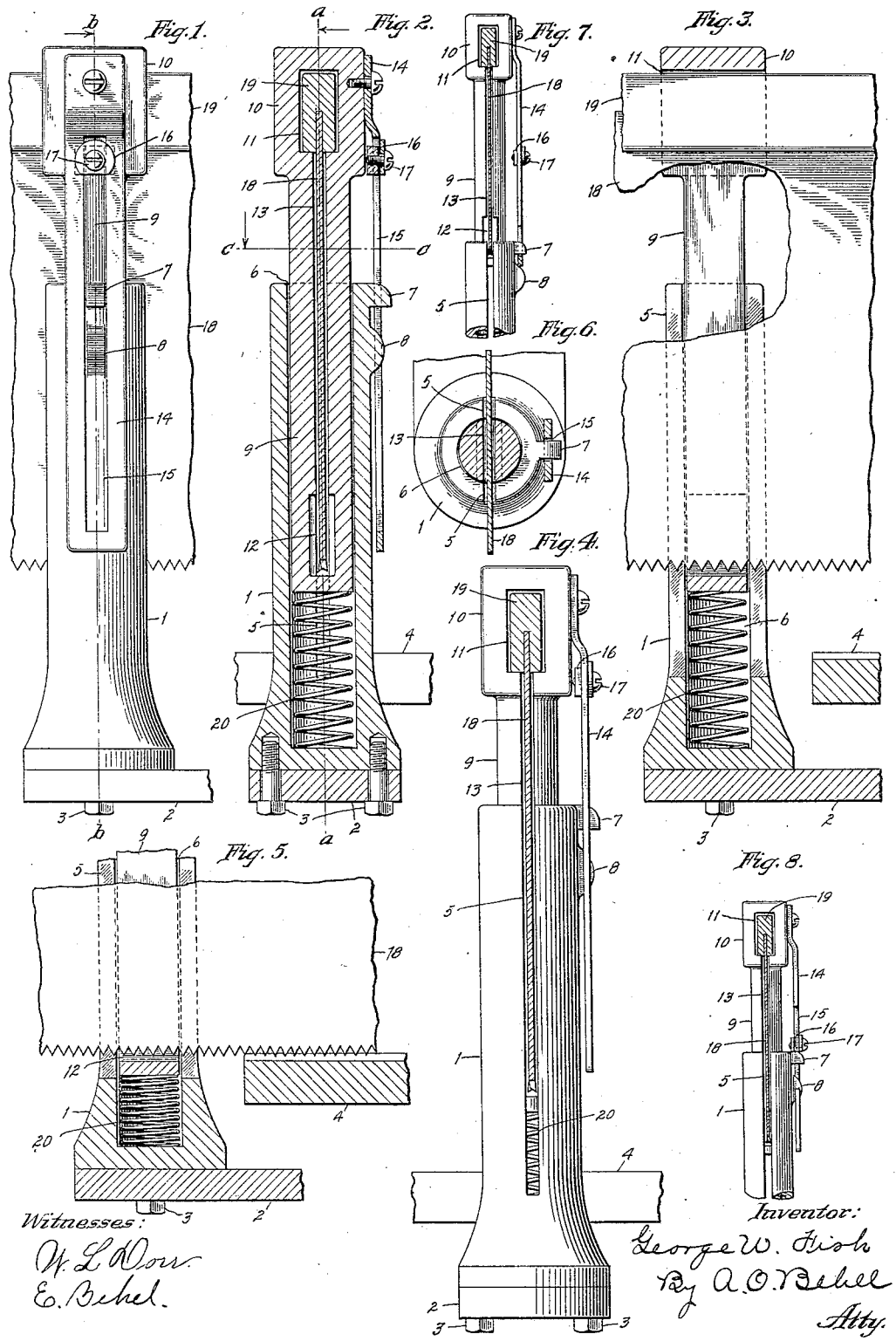

GEORGE W. FISH, OF ROCKFORD, ILLINOIS.

MITER-BOX.

1,050,208. Specification of Letters Patent. Patented Jan. 14, 1913.

Application filed August 7, 1911. Serial No. 642,849.

*To all whom it may concern:*

Be it known that I, GEORGE W. FISH, a citizen of the United States, residing at Rockford, in the county of Winnebago and State of Illinois, have invented certain new and useful Improvements in Miter-Boxes, of which the following is a specification.

The object of this invention is to construct a saw-guide for miter boxes and mitering machines in which the saw is held elevated free of the base of the box or machine when not in use and which may be forced down against spring action to finish the cut.

The further object of this invention is to arrange a stop to limit the downward movement of the saw in order to limit the depth of the cut.

In the accompanying drawings, Figure 1 is a side elevation of the saw-guide and its support. Fig. 2 is a section on line *b b* Fig. 1. Fig. 3 is a section on line *a a* Fig. 2, in which the saw is held elevated by spring action. Fig. 4 is an elevation of the saw-guide and its support. Fig. 5 is a section of the lower portion of the saw-guide and its support on line *a a* Fig. 2, in which the saw is forced down against the action of its spring support. Fig. 6 is a section on line *c c* Fig. 2. Fig. 7 is an elevation of the saw-guide in which it is shown held elevated in connection with its support. Fig. 8 shows the stop connected with the saw-guide in contact with the saw-guide support.

In the drawings I have shown one saw-guide and its support, while in a miter box or mitering machine two are generally used. The saw-guide support 1 is connected to a plate 2 by the screws 3, and a work support 4 has a fixed location with relation to the plate 2. This saw-guide support 1 is provided with a slot 5, and has a tubular opening 6 which extends nearly to the lower end of the support. From one face of this support near its upper end extends a hooked projection 7, and a rounding projection 8 located beneath the hooked projection. The saw-guide has a cylindrical shank 9 which has a head 10 provided with an opening 11 located transverse to the shank 9. An opening 12 is formed through the shank near its lower end, and a slot 13 is formed through the saw-guide 9 and connects the openings 11 and 12.

To the upper end of the saw-guide is connected a plate 14 having a lengthwise slot 15 which receives the projections 7 and 8, and serve to hold the slot 13 of the saw-guide in alinement with the slot 5 of the saw-guide support. To the plate 14 is connected a stop 16 by the screw 17 located in the slot 15 of the plate. This stop is adjustable along the slot and is located to rest on the upper face of the projection 7.

In use, the saw 18 is located in the slots 5 and 13 and the saw back 19 is located in the opening 11 in the head 10 of the saw-guide.

A coiled spring 20 is located in the opening 6 in the saw-guide support and on which rests the lower end of the saw-guide. The saw-guide being supported by the coiled spring, and the saw being supported by the saw-guide, the saw will be held elevated above the work rest 4 as shown at Fig. 3.

When it is required to cut through the work, the saw will be depressed which will compress the spring 20 as shown at Fig. 5, and upon relieving the downward force on the saw, the spring 20 will raise it and hold it elevated clear of the work rest.

When it is required to saw a certain depth, the stop 16 is adjusted in connection with the plate 14 so that it will rest on the projection 7 when the saw has cut the required depth.

By raising the saw-guide into the position shown at Fig. 7, the lower closed end of the plate 14 will pass over the projection 8 and rest between the projections 7 and 8, which will hold the saw-guide and the saw elevated above the work to be sawed.

In explanation of the action of the plate it will be evident that while the plate will ride over the projection 8 when the saw guide is manually moved upwardly, still the side plate 14 while somewhat resilient to permit it thus to move over the projection, is sufficiently rigid to retain its elevated position, as illustrated in Fig. 7, and will support the weight of the saw. The operator, however, by pressing down on the saw or upon the guide, can force the lower end of the plate 14 over the rounded projection.

I claim as my invention—

1. In a structure of the character set forth, the combination with a saw guide supporting member, of a saw guiding member slidably mounted therein, a slotted gage plate mounted on one member, and a projection carried by the other member and normally located in the slot of the plate, said projection having a beveled end and being of less cross sectional area than the slot, to permit it to pass out of the same and bear against the end of the plate for supporting the saw guide member.

2. In a structure of the character set forth, the combination with a saw guide supporting member, of a saw guide member slidably mounted thereon, a slotted gage plate secured at one end on one member and capable of lateral springing movement, and spaced projections carried by the other member, one of said projections having a stop end and being permanently located in the slot of the gage plate, the other projection having rounded ends and being of less cross sectional area than the slot, to permit it to pass in and out of the same and bear against the end of the plate for supporting the saw guide member.

In testimony whereof I have hereunto set my hand in presence of two subscribing witnesses.

GEORGE W. FISH.

Witnesses:
A. O. BEHEL,
E. BEHEL.

Copies of this patent may be obtained for five cents each, by addressing the "Commissioner of Patents, Washington, D. C."